United States Patent
Pott et al.

(10) Patent No.: US 9,523,437 B2
(45) Date of Patent: Dec. 20, 2016

(54) ELECTROMAGNETIC ACTUATOR

(75) Inventors: Ronald Pott, Sassenberg (DE); Gerhardt Ohlendorf, Braunschweig (DE); Stefan Solterbeck, Essenrode (DE); Hergen Ruetemann, Braunschweig (DE); Armin Beck, Denkingen (DE); Wolfram Maiwald, Villingen-Schwenningen (DE); Gerhard Theissl, Sankt Peter im Sulmtal (AT); Emil Lambauerl, Lebring (AT)

(73) Assignee: KENDRION (Villingen) GmbH, Villingen-Schwenningen (DE)

( * ) Notice: Subject to any disclaimer, the term of this patent is extended or adjusted under 35 U.S.C. 154(b) by 0 days.

(21) Appl. No.: 14/004,216

(22) PCT Filed: Mar. 8, 2012

(86) PCT No.: PCT/EP2012/001044
§ 371 (c)(1),
(2), (4) Date: Mar. 5, 2014

(87) PCT Pub. No.: WO2012/123086
PCT Pub. Date: Sep. 20, 2012

(65) Prior Publication Data
US 2014/0166914 A1 Jun. 19, 2014

(30) Foreign Application Priority Data
Mar. 11, 2011 (DE) .................. 10 2011 013 702

(51) Int. Cl.
*F16K 31/04* (2006.01)
*F16K 31/06* (2006.01)
(Continued)

(52) U.S. Cl.
CPC .......... *F16K 31/04* (2013.01); *F02M 63/0015* (2013.01); *F02M 63/0036* (2013.01);
(Continued)

(58) Field of Classification Search
CPC .. F16K 31/0665; F16K 31/0693; F16K 31/04; H01F 7/1638; F02M 63/0015; F02M 63/0043; F02M 2200/28; F02M 63/0036; F02M 63/0052; F02M 2200/304; F02M 63/025; H02K 33/02
(Continued)

(56) References Cited

U.S. PATENT DOCUMENTS 2,930,404 A * 3/1960 Slawomir Kowalski et al. .......................... 251/129.16
4,634,096 A * 1/1987 Hara ........................ 251/129.07
(Continued)

FOREIGN PATENT DOCUMENTS

DE 102 47 436 A1 5/2003
DE 10 2006 042 214 A1 3/2008
(Continued)

OTHER PUBLICATIONS

Translation of EP2187037, Wieland et al., Oct. 2009.*
(Continued)

*Primary Examiner* — John Bastianelli
(74) *Attorney, Agent, or Firm* — Juneau & Mitchell

(57) ABSTRACT

The invention is an electromagnetic actuator with a magnet coil arranged in a housing and with an armature plate, which is movable by energization of the magnet coil in an armature plate space in the direction of a front end of the housing and which is connected to an armature plunger, which at one end is guided through the housing and protrudes into a control space; according to the invention the armature plate is formed with at least one axial pressure compensation bore so as to produce pressure compensation between the armature plate space and the control space, and the housing has at least one bearing with at least one axial groove, in which the armature plunger is mounted movably.

12 Claims, 3 Drawing Sheets

(51) Int. Cl.
*H01F 7/16* (2006.01)
*F02M 63/00* (2006.01)
*F02M 63/02* (2006.01)
*H02K 33/02* (2006.01)

(52) U.S. Cl.
CPC .... *F02M 63/0043* (2013.01); *F02M 63/0052* (2013.01); *F02M 63/025* (2013.01); *F16K 31/0665* (2013.01); *F16K 31/0693* (2013.01); *H01F 7/1638* (2013.01); *H02K 33/02* (2013.01); *F02M 2200/28* (2013.01); *F02M 2200/304* (2013.01)

(58) Field of Classification Search
USPC ............ 251/129.07, 129.16, 54, 48; 335/257
See application file for complete search history.

(56) References Cited

U.S. PATENT DOCUMENTS

| | | | | |
|---|---|---|---|---|
| 5,560,549 | A * | 10/1996 | Ricco et al. | 251/129.16 |
| 5,856,771 | A * | 1/1999 | Nippert | 251/129.15 |
| 5,878,965 | A * | 3/1999 | Coldren et al. | 251/129.07 |
| 6,036,120 | A * | 3/2000 | Varble et al. | 251/129.1 |
| 6,116,276 | A * | 9/2000 | Grill | 251/129.07 |
| 6,655,657 | B2 * | 12/2003 | Bircann | F02M 25/0701 251/214 |
| 6,732,959 | B2 * | 5/2004 | Delaney et al. | 251/129.1 |
| 6,789,778 | B1 * | 9/2004 | Spahn et al. | 251/129.07 |
| 6,957,656 | B2 * | 10/2005 | Tochiyama et al. | 251/129.08 |
| 2009/0026230 | A1 * | 1/2009 | Robinson et al. | 222/504 |
| 2009/0314977 | A1 * | 12/2009 | Beck et al. | 251/129.15 |

FOREIGN PATENT DOCUMENTS

| | | |
|---|---|---|
| DE | 10 2006 042 215 A1 | 3/2008 |
| DE | 10 2006 054 941 B3 | 5/2008 |
| DE | 10 2007 013 525 A1 | 9/2008 |
| DE | 10 2007 032 873 A1 | 1/2009 |
| EP | 2 187 037 A1 | 5/2010 |

OTHER PUBLICATIONS

Office Action from corresponding German Patent Application No. DE 10 2011 013 702.5
International Search Report from corresponding PCT/EP2012/001044.

* cited by examiner

ELECTROMAGNETIC ACTUATOR

CROSS REFERENCE TO RELATED APPLICATIONS

This patent application claims priority to International Patent Application PCT/EP2012/001044, filed on Mar. 8, 2012, and thereby to German Patent Application 10 2007 013 702.5, filed on Mar. 11, 2011.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to an electromagnetic actuator as claimed herein and to a method for equalizing the pressure between an armature plate space and a control space of the electromagnetic actuator of this invention.

Background of the Invention

The current state of knowledge is as follows.

An electromagnetic actuator is known for example from DE 10 2007 013 525 A1.

Electromagnetic actuators are known, for example as solenoids or solenoid actuators, in which an armature is connected to a plunger moved by a magnetic force generated by the energization of the magnet coil in the direction of a pole core. The plunger thereby closes a control space, which comprises an actuating device. This actuating device, for example a switch or a valve device in a fluid power application, is actuated by the plunger, whereby, for example, an energization-dependent force is generated for pressure control by means of the magnet coil with which a sealing element, e.g. a ball of a valve, is pressed against the valve seat of the valve by the plunger, thereby adjusting or regulating the energization-dependent differential pressures. From EP 2 187 037 A1 a fuel metering unit is known for the intake-side delivery volume of a high pressure fuel pump of a fuel injection device for internal combustion engines, whereby this comprises a control valve actuated by an electromagnetic actuator. This actuator comprises a magnet coil, an armature arranged on a plunger that is guided in a bush and is so moved on energization of the solenoid by the magnetic force generated that the plunger protruding into a control space of a valve housing of the control valve actuates a piston-shaped valve element. In this case, the plunger is mounted on bearings arranged in the valve housing on the valve side in a cylinder, whereby the plunger is displaceable on the other side in a bearing bush at the opposite end of the valve housing, whereby the end of the plunger moves into a hollow space connected to this bearing bush.

During the operation of this known fuel metering unit, fuel is forcibly moved by the movement of the plunger inside the fuel metering unit. To avoid the function of the fuel metering unit being thereby hindered, it is proposed to form such a bearing bush with at least one axial groove to serve as a pressure compensation bore, which can be arranged both on its outside and on its inside. By means of such a bearing bush with axial grooves, pressure compensation bores can at least be partly avoided inside the valve housing and/or the armature.

However, this well-known measure of providing axial grooves in bearing bushes to serve as pressure compensation bores is not sufficient for reliable pressure compensation in unfavorable operating conditions of the electromagnetic actuator.

Thus, for example, pressure control valves for modern diesel common rail injection systems require very precise control of the injection pressure and need a high stability against both high pressure fluctuations as well as increasingly against increased pressures on the low pressure side.

In this case, pressure pulsation not only occurs in certain pressure ranges, but also often in unfavorable operating conditions, such as during a cold start of the engine at −25° C. These pressure pulsations in a high pressure accumulator (common rail) usually lead to vibrations in other attachments, for example tank lines, and are associated with a poorly running engine.

For completeness, reference is made to DE 10 2006 054 941 B3, which describes a solenoid having a cylindrical hollow and a magnetic body filled with a medium in which a stroke armature arrangement with an armature and a plunger is axially movable in the medium in the direction of actuation by a magnetic force. The plunger is anchored in an axial bore in the armature while the armature has pressure compensation bores to produce pressure compensation between the two end faces of the armature, which are arranged as close as possible in the region of the axial bores receiving the plunger. Thus, pressure compensation is achieved only in the swept volume of the armature. However, even this measure does not lead to a desired reduction of pressure pulsations in an electromagnetic actuator of the kind mentioned initially.

The invention has for its object the provision of an electromagnetic actuator of the type that reacts significantly more robustly to pressure pulsations.

BRIEF SUMMARY OF THE INVENTION

Electromagnetic actuator having a magnet coil arranged in a housing and an armature plate which moves in an armature plate space towards a front end of the housing by energizing the magnet coil and which is connected to an armature plunger projecting into a control space that is guided through the end of the housing wherein, to produce pressure compensation between the armature plate space and the control space, the armature plate is designed with at least one axial pressure compensation bore, while the housing has at least one bearing with at least one axial groove-in which the armature plunger is movably supported.

The electromagnetic actuator disclosed herein, further comprising wherein the armature plunger is supported in two bearings each having at least one axial groove, whereby a bearing is arranged on the armature-side end of the housing and another bearing is arranged opposite to the armature-side end of the housing.

The electromagnetic actuator disclosed herein, further comprising wherein the at least one pressure compensation bore is arranged radially adjacent to the circumference of the armature plunger in the armature plate.

The electromagnetic actuator disclosed herein, further comprising wherein the at least one pressure compensation bore of the armature plate is aligned with the axial groove of the at least one bearing.

The electromagnetic actuator disclosed herein, further comprising wherein the pressure compensation is adjusted by the number and/or size of the pressure equalizing bores in the armature plate.

The electromagnetic actuator disclosed herein, further comprising wherein the control space has an actuator that is operable by the armature plunger.

The electromagnetic actuator disclosed herein, further comprising wherein the housing is designed as a valve housing having a valve device as the actuator.

The electromagnetic actuator disclosed herein, further comprising wherein the armature-side bearing has four axial grooves equally distributed on the inner circumference, where each has a cross section between 0.30 mm$^2$ and 0.50 mm$^2$, or has two diametrically opposed axial grooves on the inner periphery with a respective cross section between 0.50 mm$^2$ and 1.50 mm$^2$.

The electromagnetic actuator disclosed herein, further comprising wherein the bearing facing away from the armature has four axial grooves equally distributed on the inner circumference, each having a cross section between 0.30 mm$^2$ and 0.50 mm$^2$, or has two axial grooves equally distributed on the inner circumference, each having a cross section between 0.5 mm$^2$ and 1.5 mm$^2$.

The electromagnetic actuator disclosed herein, further comprising wherein the armature plate has four pressure compensation bores arranged in a circle each having a cross section between 0.8 mm$^2$ and 1.5 mm$^2$.

The electromagnetic actuator disclosed herein, further comprising wherein the armature plate has two circularly arranged pressure compensation bores each having a cross section between 1.2 mm$^2$ and 2.5 mm$^2$.

BRIEF DESCRIPTION OF THE DRAWINGS

FIG. 2b is a line drawing evidencing a sectional view of the armature plate according to section A-A of FIG. 2a.

DETAILED DESCRIPTION OF THE INVENTION

Figure 1:
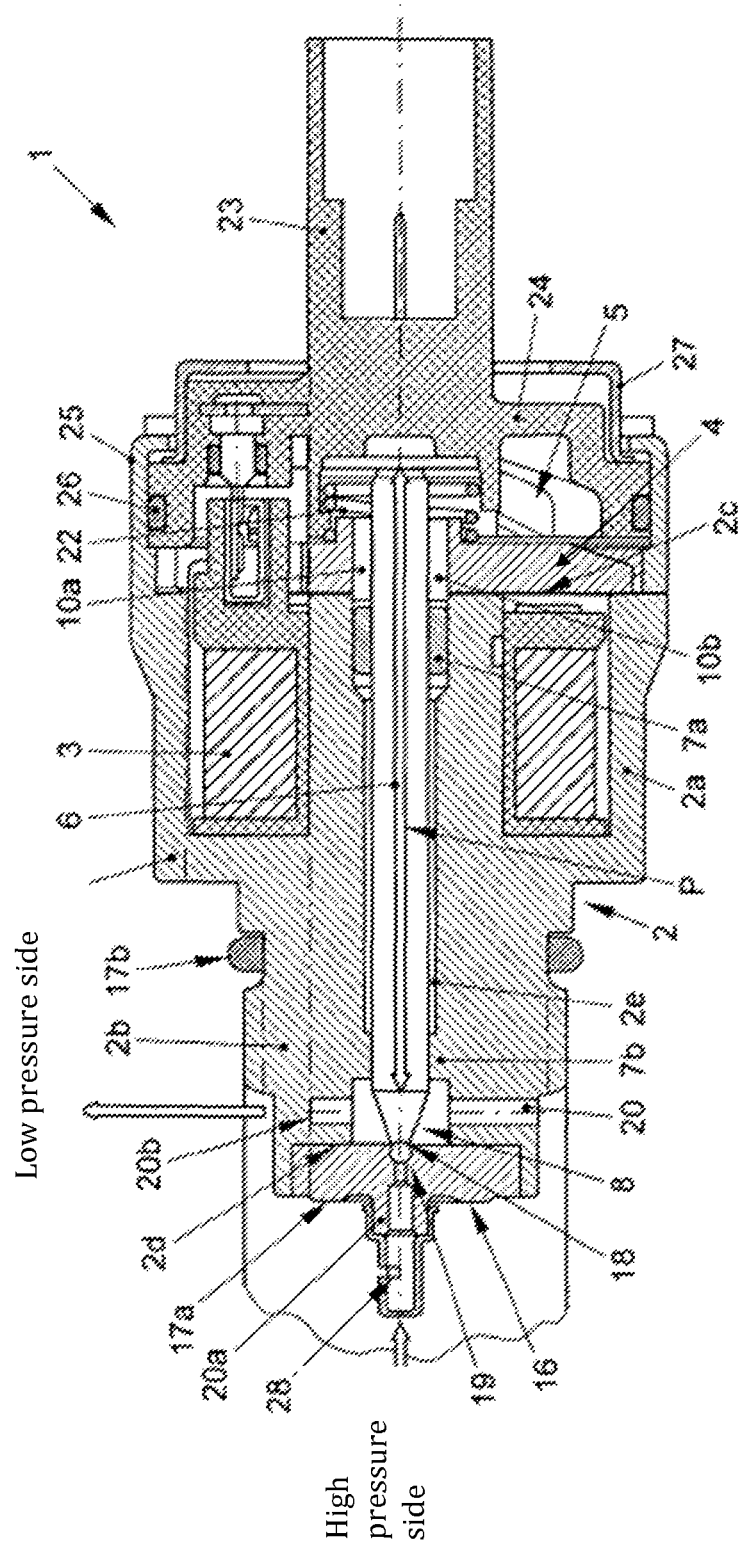
FIG. 1 is a line drawing evidencing a sectional view of an electromagnetic actuator according to one embodiment of the invention.

The object of the invention is an electromagnetic actuator with a magnet coil arranged in a housing of the actuator and an armature plate that is movable in an armature plate space towards a front end of the housing on energization of the solenoid coil and where the armature plate is connected at one end to an armature plunger that is guided through the housing and projects into a control space, it is provided according to the invention that to produce pressure compensation between the armature plate space and the control space, the anchor plate is designed with at least one axial pressure compensation bore while the housing has at least one bearing with at least one axial groove in which the armature plunger is movably supported.

This makes it possible to achieve direct pressure compensation between the armature plate space and the control space, so that the occurrence of pressure pulsations induced in the actuated device by the plunger actuator is significantly reduced in particular by means of a valve device.

In a further development of the invention, the armature plunger is supported in two bearings, each having at least one axial groove, whereby a bearing is arranged facing towards the armature-side of the housing and a further bearing is arranged facing away from the armature-side of the housing. Thus, precise guidance of the armature plunger is ensured in the housing because of the axial grooves inside the bearing, while the friction is reduced because of the smaller contact surfaces.

A particularly advantageous embodiment of the invention is obtained with an arrangement of at least one pressure compensation bore in the armature plate that is radially adjacent to the circumference of the armature plunger. This is characterized by the pressure compensation bore being located directly adjacent to the bore in the armature plate receiving the armature plunger, and providing more direct pressure compensation with the control space.

It is particularly advantageous according to a further embodiment of the invention, if at least one pressure compensation bore in the armature plate is aligned with the axial groove of at least one bearing, so that direct fluid communication and thus pressure exchange is possible by means of a control valve serving as an electromagnetic actuator in fluidic applications.

According to a further embodiment of the invention, the pressure compensation is adjusted by the number and/or size of the pressure compensation bores in the armature plate. Thus, the degree of pressure compensation can be adjusted to minimize the effect of pressure pulsations occurring in the actuator operated by the armature plunger, in particular a valve device.

According to a further development, the control space comprises an actuating device operable by the armature plunger, preferably a valve device, whereby the housing is designed as a valve housing.

The inventive method for equalizing pressure between an armature plate space and a control space by means of the electromagnetic actuator is so effected in that the measurement of the pressure compensation is controlled by the number and/or size of the pressure compensation bores in the armature plate.

This inventive method is particularly effective, i.e. it enables the degree of pressure compensation to be adjusted very accurately when the axial grooves in the bearing position are designed to be sufficiently large. To achieve this, preferably four axial grooves each with a cross section between 0.30 mm$^2$ and 0.50 mm$^2$ are distributed on the inner circumference both in the armature-side bearing face as well as in the face opposite the armature bearing. The bearings may be designed with only two axial grooves preferably with a cross section between 0.50 mm$^2$ and 1.50 mm$^2$ in each case.

It is particularly advantageous for the adjustment of the pressure compensation if the armature plate is designed with either four circularly arranged pressure compensation bores each with a cross section between 0.80 mm$^2$ and 1.50 mm$^2$, or two pressure compensation bores each with a cross section between 1.20 mm$^2$ and 2.50 mm$^2$.

It is particularly advantageous if the axial grooves and the pressure compensation bores are aligned with the same

DETAILED DESCRIPTION OF THE FIGURES

The electromagnetic actuator 1 shown in FIG. 1 illustrates a pressure control valve for a high pressure accumulator or a high pressure pump of a fuel injection system.

This pressure control valve 1 according to FIG. 1 comprises a housing in the form of a valve housing 2 made of soft magnetic material having a substantially cylindrical valve housing portion 2a receiving a magnet coil 3, and forming a valve device 16 in the form of a seat valve by means of an associated further smaller diameter cylindrical valve housing part 2b. This pressure control valve 1 (not shown) is screwed with this other valve housing part 2b into a high pressure accumulator, whereby a gripping edge 17a seals off the high pressure side from the low pressure side, while a seal 17b is a seal against the environment.

A valve plunger 6 is moved axially in an axial valve plunger bore 2e of the valve housing 2 by means of two bearings 7a and 7b, which is conically shaped at its valve seat side end and actuates a ball-shaped sealing element 18 of the poppet valve 16. The valve seat of this valve ball 18 is formed by a valve seat member 19 that is arranged at the end face in a blind bore of the valve body part 2b, and has a channel 20a to the common rail that can be closed by the valve ball 18 which establishes a connection to the high pressure accumulator via a filter element 27.

In the axial region of the valve device 16, the valve housing part 2b has a diversion space 8 in the form of a control space, which is connected with a tank system (not shown) via radially extending spill ports 20b in the valve body part 2b.

The valve housing part 2a has an annular cylinder bore 21 to receive the magnet coil 3, so that a pole face with a split face forms the armature-side end face 2c of the valve housing 2, i.e. the valve body part 2a. This end face 2c is opposite a pole face of an armature plate 4, which is firmly connected to the valve plunger 6.

The armature plate 4 is acted upon by a compression spring 22 in the direction of the end face 2c of the valve housing 2 and the valve seat 16, which is received in a blind bore in a connection part 23 and is supported against the same. This connection part 23 serves to limit the stroke of the armature plate 4, receives electrical connection leads of the magnet coil 3, and serves as the housing part closing the pressure control valve 1.

The end face 2c of the valve body part 2a has a tubular shape to receive a correspondingly shaped cylindrical part 24 of the connecting part 23, whereby a seal 26 is provided for the sealing of the armature plate space 5 from the outside between the outer peripheral surface of the cylindrical part 24 and the inner peripheral surface of the tubular extension 25.

When this pressure control valve 1 is connected, for example, to a high pressure accumulator, the high pressure in the non-energized condition of the magnet coil 3 causes the ball valve 18 to be lifted from its valve seat, allowing the medium to flow from the high pressure accumulator via the spill ports 20. Energization of the magnet coil 3 causes the armature plate 4 to be pressed against the end face 2c of the valve body part 2a, so that the valve ball 18 is pressed into the valve seat of the poppet valve 16 by means of the valve plunger 6, thereby controlling the flow as a function of the coil current and thus enabling control of the high pressure.

To achieve a pressure compensation between the spill space 8 and the armature plate space 5, four pressure compensation bores 10a to 10d and 11a and 11b are provided in the armature plate 4 while axial grooves are provided in the bearings 7a and 7b in the valve plunger bore 2e as is explained in more detail below.

Figure 2A:
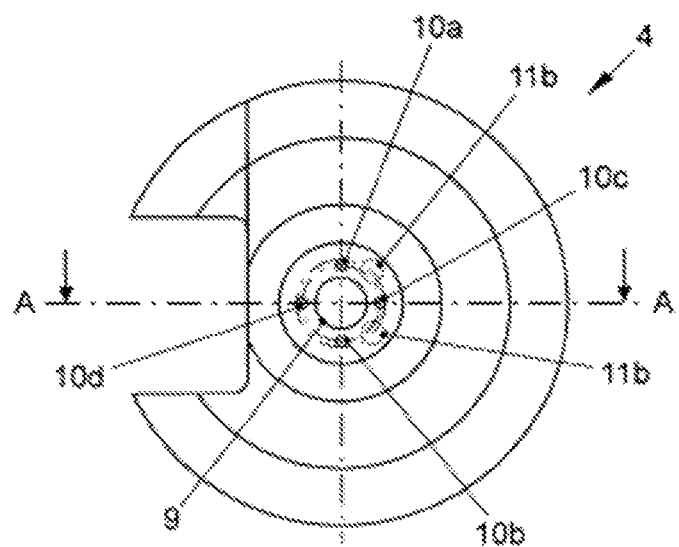
FIG. 2a is a line drawing evidencing a plan view of an armature plate of the electromagnetic actuator of FIG. 1.
Figure 2B:
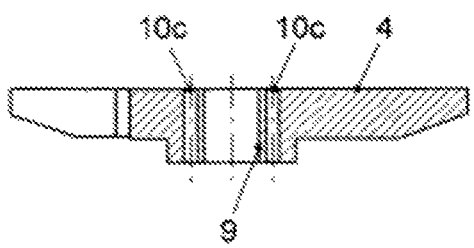

In the embodiment of the pressure regulating valve 1 according to FIG. 1, the armature plate 4 has four evenly distributed pressure compensation bores in a circle 10a, 10b, 10c, and 10d, as shown in the plan view of this armature plate 4 according to FIG. 2a. The two pressure compensation bores 10a and 10b are shown in the sectional view of FIG. 1. The pressure compensation bores 10c and 10d can be seen in the sectional view of FIG. 2b.

Alternatively, the armature plate 4 according to FIG. 2a can also be designed with only two pressure compensation bores 11a and 11b (shown in dashed lines in FIG. 2a) whose cross sections, however, are about twice as large as in the embodiment featuring four pressure compensation bores 10a to 10d. It can be seen from FIG. 2a that the two pressure compensation bores 11a and 11b are in a radial arrangement at right angles to one another.

In both embodiments of the armature plate 4, the pressure compensation bores 10a to 10d and 11a and 11b are immediately adjacent to the central bore 9 that is intended to receive the armature plunger 6. The armature plate 4 as shown in FIG. 2 has a radially extending groove 28 through which are guided coil leads for the magnet coil 3. Since this groove 28 also effects pressure compensation, only two bores 11a and 11b are provided on the side opposite to the groove 28 in the embodiment as can be clearly seen in FIG. 2a.

Figure 3:
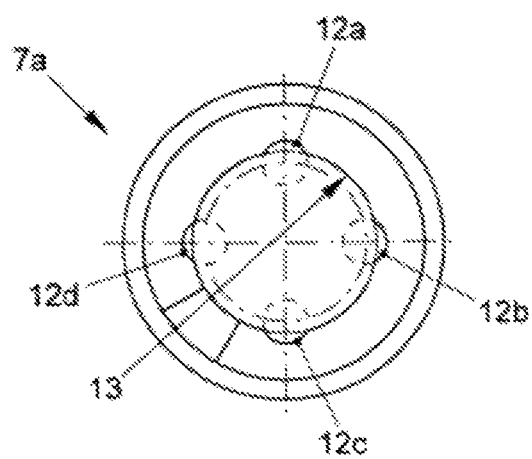
FIG. 3 is a line drawing evidencing a plan view of an armature-side bearing location of the electromagnetic actuator of FIG. 1.

The armature-side bearing 7a shows a bearing bush made of plastic, e.g. Torion®, which is pressed into the valve plunger bore 2e and whose plan view is shown in FIG. 3. Four axial grooves 12a, 12b, 12c and 12d are uniformly distributed around the circumference on the inner surface 13 of this bearing bush 7a. The armature plate 4 with the four pressure compensation bores 10a to 10d, and this bearing bush 7a may be so aligned with respect to one another that the four axial grooves 12a to 12d are aligned with the pressure compensation bores 10a to 10d of the armature plate 4 in order to achieve direct fluid compensation.

Figure 4:
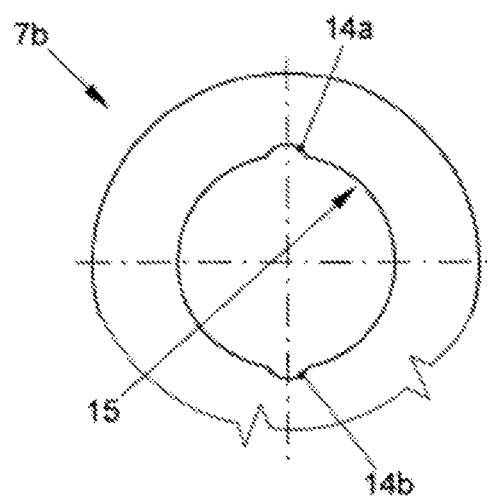
FIG. 4 is a line drawing evidencing a plan view of a bearing location facing away from the armature of the electromagnetic actuator of FIG. 1.

FIG. 4 shows a plan view of the bearing 7b which is arranged in the valve stem bore 2e according to FIG. 1 at the end 2b of the valve body 2 facing away from the armature. Four axial grooves 14a to 14d are arranged at 90° to one another on the inner surface 15 of the bearing 7b. These axial grooves 14a to 14d are aligned with the axial grooves of the bearing bush 7a and the pressure compensation bores in the armature plate 4.

Pressure compensation between the armature plate space 5 and the spill space 8 is effected by means of these pressure compensation bores 10a to 10e, and 11a and 11b in the armature plate 4, and the axial grooves 12a to 12d and 14a to 14d in the two bearings 7a and 7b, so that pressure pulsations in the connected accumulator (common rail) do not act against valve elements, but flow around all the valve elements. This pressure compensation is illustrated schematically in FIG. 1 by arrow P.

The two bearings 7a and 7b may also be designed respectively with two axial grooves 12a and 12b or 14a and 14b.

The degree of pressure compensation between the armature plate space 5 and the spill space 8 may be adjusted by dimensioning the pressure compensation bores and/or their number, when the sum of the cross sections of the axial grooves in each of the two bearings 7a and 7b is sufficiently large. The latter condition can be achieved either by increasing the cross section and/or increasing the number of axial grooves in the bearings 7a and 7b.

With respect to the bearing 7b opposite the armature, this means that a cross section between 0.50 mm² and 1.50 mm² is sufficient in the case of two axial grooves 14a and 14b, while a cross section between 0.30 mm² and 0.50 mm² is sufficient in the case of four axial grooves as shown in FIG. 4. Of course, more than four axial grooves may be provided.

The axial grooves 12a to 12d of the armature-side bearing bush 7a each has a cross section between 0.30 mm² and 0.50 mm². If only two axial grooves are provided in the bearing bush 7a, a cross section between 0.50 mm² and 1.50 mm² is sufficient. The bearing bush 7a may be designed with more than four axial grooves.

To adjust the pressure compensation, the cross sections of the four pressure compensation bores 10a to 10d of the armature plate 4 can each be between 0.80 mm² and 1.50 mm², or in the case of an armature plate 4 with two pressure compensation bores 11a and 11b, respectively between 1.50 mm² and 2.50 mm².

LIST OF REFERENCE NUMBERS

1 Electromagnetic actuator
2 Housing, valve housing
2a Valve housing part
2b Valve housing part
2c Armature-side end face of the housing 2
2d End face of the housing 2 facing away from the armature
2e Valve plunger bore
3 Magnet coil
4 Armature plate
5 Armature plate space
6 Armature plunger, valve plunger
7a Bearing, bearing bush
7b Bearing
8 Control space, spill space
9 Central bore in the armature plate 4
10a-10d Pressure compensation bores in the armature plate 4
11a Pressure compensation bore in the armature plate 4
11b Pressure compensation bore in the armature plate 4
12a-12d Axial grooves in the bearing 7a
13 Inner surface of the bearing 7a
14a Axial groove of the bearing 7b
14b Axial groove of the bearing 7b
15 Inner surface of the bearing 7b
16 Valve device, valve seat
17a Gripping edge
17b Seal
18 Sealing element, valve ball
19 Valve seating element
20a Channel
20b Spill ports
21 Circular cylinder bore in the valve housing part 2a
22 Spring
23 Connecting part
24 Cylindrical part 23 of the connecting part
25 Extension of the valve housing part 2a
26 Seal
27 Filter element
28 Groove of the armature plate 4

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:

1. An electromagnetic actuator having a magnet coil arranged in a housing and an armature plate which moves in an armature plate space towards a front end of the housing by energizing the magnet coil and which is connected to an armature plunger projecting into a control space that is guided through the end of the housing, wherein, to produce pressure compensation between the armature plate space and the control space, the armature plate is designed with at least one axial pressure compensation bore, while the housing has at least one bearing in which the armature plunger is movably supported and in which on the inner circumference at least one axial groove is formed, wherein the at least one bearing is located between the armature plate and the control space, wherein the armature plunger is supported in two bearings each having at least one axial groove, whereby the first bearing is arranged on the armature-side end of the housing and the second bearing is arranged opposite to the armature-side end of the housing, the first bearing and the second bearing being arranged on the same side of the armature plate.

2. The electromagnetic actuator of claim 1, further comprising wherein the at least one pressure compensation bore is arranged radially adjacent to the circumference of the armature plunger in the armature plate.

3. The electromagnetic actuator claim 1, further comprising wherein the at least one pressure compensation bore of the armature plate is aligned with the axial groove of the at least one bearing.

4. The electromagnetic actuator of claim 1, further comprising wherein the pressure compensation is adjusted by the number and/or size of the pressure equalizing bores in the armature plate.

5. The electromagnetic actuator of claim 1, further comprising wherein the control space has a valve device that is operable by the armature plunger.

6. The electromagnetic actuator of claim 5, further comprising wherein the housing is designed as a valve housing having a valve device as the actuator.

7. The electromagnetic actuator of claim 1, further comprising wherein the armature-side bearing has four axial grooves equally distributed on the inner circumference, where each has a cross section between 0.30 mm² and 0.50 mm², or has two diametrically opposed axial grooves on the inner periphery with a respective cross section between 0.50 mm² and 1.50 mm².

8. The electromagnetic actuator of claim 1, further comprising wherein the bearing facing away from the armature has four axial grooves equally distributed on the inner circumference, each having a cross section between 0.30 mm² and 0.50 mm², or has two axial grooves equally distributed on the inner circumference, each having a cross section between 0.5 mm² and 1.5 mm².

9. The electromagnetic actuator of claim 1, further comprising wherein the armature plate has four pressure compensation bores arranged in a circle each having a cross section between 0.8 mm² and 1.5 mm².

10. The electromagnetic actuator of claim 1, comprising wherein the armature plate has two circularly arranged pressure compensation bores each having a cross section between 1.2 mm² and 2.5 mm².

11. The electromagnetic actuator of claim 1, further comprising wherein the pressure compensation is adjusted by the number and/or size of the pressure equalizing bores in the armature plate and the control space has a valve device that is operable by the armature plunger.

12. An electromagnetic actuator having a magnet coil arranged in a housing and an armature plate which moves in an armature plate space towards a front end of the housing by energizing the magnet coil and which is connected to an armature plunger projecting into a control space that is guided through the end of the housing, wherein, to produce pressure compensation between the armature plate space and the control space, the armature plate is designed with at least one axial pressure compensation bore, while the housing has at least one bearing in which the armature plunger is movably supported and in which on the inner circumference at least one axial groove is formed, wherein the at least one bearing is located between the armature plate and the control space, wherein the armature plunger is supported in two bearings each having at least one axial groove, whereby the first bearing is arranged on the armature-side end of the housing and the second bearing is arranged opposite to the armature-side end of the housing, and wherein the at least one pressure compensation bore of the armature plate is aligned with the axial groove of the first bearing and the second bearing.

* * * * *